US012594630B2

(12) United States Patent
Wang et al.

(10) Patent No.: US 12,594,630 B2
(45) Date of Patent: Apr. 7, 2026

(54) AMORPHOUS PHASE MODIFICATION APPARATUS AND PROCESSING METHOD OF SINGLE CRYSTAL MATERIAL

(71) Applicants:GlobalWafers Co., Ltd., Hsinchu (TW); mRadian Femto Sources Co., Ltd., Hsinchu City (TW)

(72) Inventors: Shang-Chi Wang, Hsinchu (TW); Chia-Chi Tsai, Hsinchu (TW); I-Ching Li, Hsinchu (TW); Chien Chung Lee, Hsinchu (TW); Bo-Kai Wang, Hsinchu (TW)

(73) Assignees: GlobalWafers Co., Ltd., Hsinchu (TW); mRadian Femto Sources Co., Ltd., Hsinchu City (TW)

( * ) Notice: Subject to any disclaimer, the term of this patent is extended or adjusted under 35 U.S.C. 154(b) by 240 days.

(21) Appl. No.: 18/454,069

(22) Filed: Aug. 23, 2023

(65) Prior Publication Data

US 2024/0075558 A1 Mar. 7, 2024

Related U.S. Application Data

(60) Provisional application No. 63/400,052, filed on Aug. 23, 2022.

(51) Int. Cl.
B23K 26/364 (2014.01)
B23K 26/064 (2014.01)
B23K 26/082 (2014.01)

(52) U.S. Cl.
CPC ........ B23K 26/364 (2015.10); B23K 26/0648 (2013.01); B23K 26/082 (2015.10)

(58) Field of Classification Search
CPC .. B23K 26/0006; B23K 26/53; B23K 26/082; B23K 26/0648; B23K 26/402; B23K 26/0624; B23K 26/364
See application file for complete search history.

(56) References Cited

U.S. PATENT DOCUMENTS

| | | |
|---|---|---|
| 2016/0318122 A1 | 11/2016 | Ota et al. |
| 2020/0072599 A1 | 3/2020 | Van Dam et al. |

(Continued)

FOREIGN PATENT DOCUMENTS

| | | |
|---|---|---|
| CN | 109954978 | 7/2019 |
| CN | 110769967 | 2/2020 |

(Continued)

OTHER PUBLICATIONS

Borlinghaus, Rolf T., "What is a Resonant Scanner?", Mar. 10, 2019, pp. 1-4. Available at: https://www.leica-microsystems.com/science-lab/life-science/what-is-a-resonant-scanner/.

(Continued)

*Primary Examiner* — Monica A Huson
(74) *Attorney, Agent, or Firm* — JCIPRNET

(57) ABSTRACT

A processing method of a single crystal material includes the following steps. A single crystal material is provided as an object to be modified. The amorphous phase modification apparatus is used for emitting a femtosecond laser beam to process an internal portion of the object to be modified. The processing includes using a femtosecond laser beam to form a plurality of processing lines in the internal portion of the object to be modified, wherein each of the processing lines include a zigzag pattern processing, and a processing line spacing between the plurality of processing lines is in a range of 200 μm to 600 μm, wherein after the object to be modified is processed, a modified layer is formed in the object to be modified. Slicing or separating out a portion in the object to be modified that includes the modified layer.

9 Claims, 5 Drawing Sheets

(56) References Cited

U.S. PATENT DOCUMENTS

| | | | | |
|---|---|---|---|---|
| 2020/0164463 | A1* | 5/2020 | Shibazaki | ......... B23K 26/0344 |
| 2020/0262008 | A1 | 8/2020 | Beyer | |
| 2022/0134476 | A1 | 5/2022 | Vorontsov et al. | |

FOREIGN PATENT DOCUMENTS

| | | |
|---|---|---|
| CN | 107427958 | 11/2020 |
| CN | 107717248 | 2/2021 |
| CN | 113544813 | 10/2021 |
| CN | 215432111 | 1/2022 |
| CN | 108883502 | 4/2022 |
| CN | 114603249 | 6/2022 |
| DE | 102010030358 | 12/2011 |
| JP | 2011108698 | 6/2011 |
| JP | 2017526161 | 9/2017 |
| JP | 2018010894 | 1/2018 |
| JP | 2018093046 | 6/2018 |
| JP | 2020510538 | 4/2020 |
| JP | 2020518130 | 6/2020 |
| TW | 201924838 | 7/2019 |

OTHER PUBLICATIONS

"Office Action of Taiwan Counterpart Application", issued on Mar. 8, 2024, p. 1-p. 10.
"Office Action of Taiwan Counterpart Application", issued on Aug. 6, 2024, p. 1-p. 11.
"Office Action of Japan Counterpart Application", issued on Oct. 24, 2024, p. 1-p. 4.

* cited by examiner

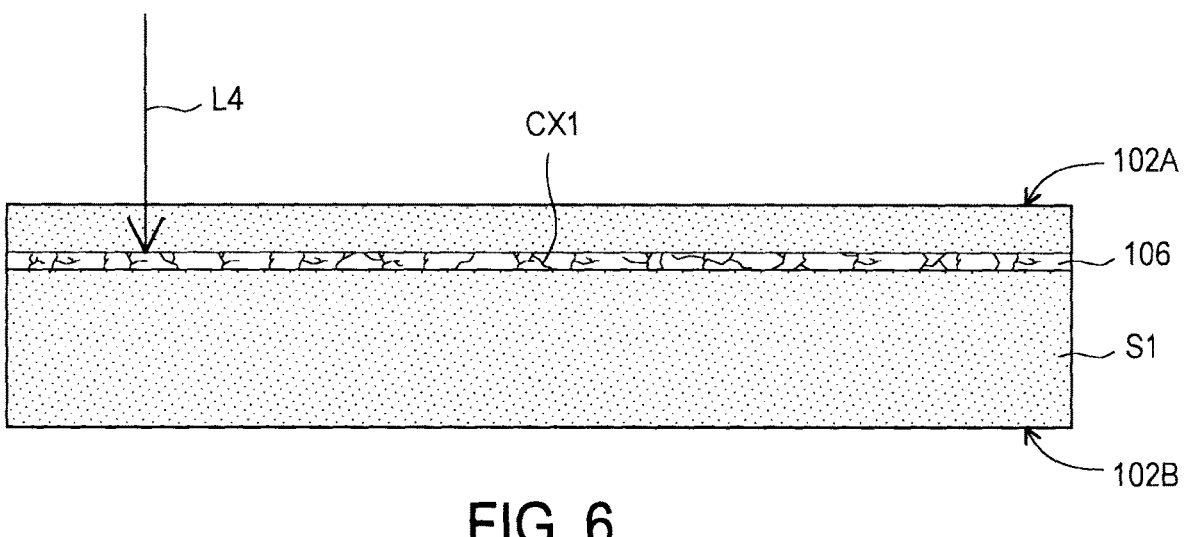
FIG. 6
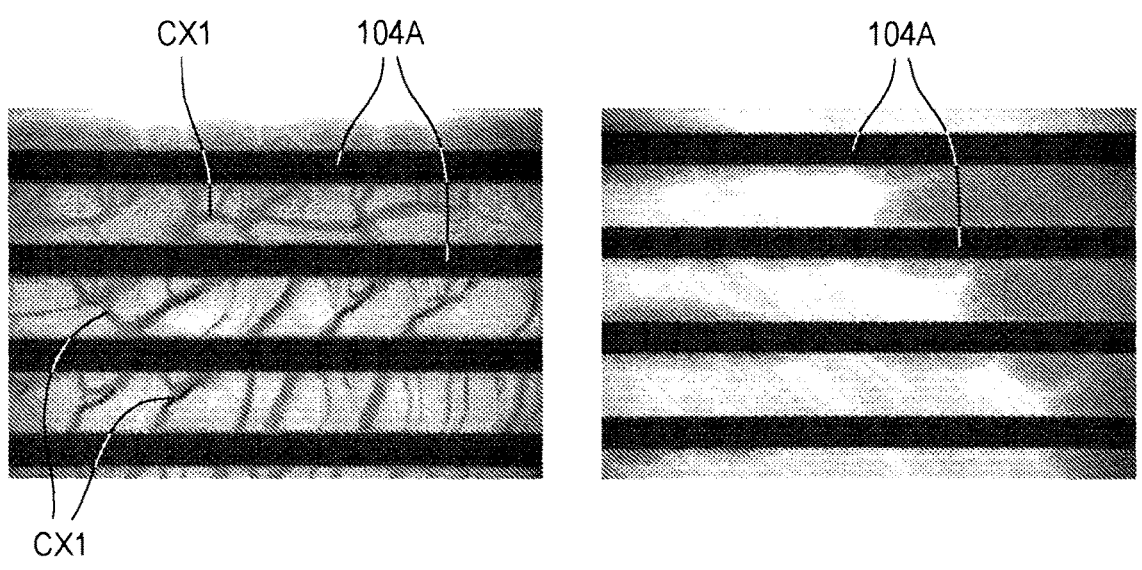
FIG. 7A                    FIG. 7B

AMORPHOUS PHASE MODIFICATION APPARATUS AND PROCESSING METHOD OF SINGLE CRYSTAL MATERIAL

CROSS-REFERENCE TO RELATED APPLICATION

This application claims the priority benefit of U.S. provisional application Ser. No. 63/400,052, filed on Aug. 23, 2022. The entirety of the above-mentioned patent application is hereby incorporated by reference herein and made a part of specification.

BACKGROUND

Technical Field

The present disclosure relates to an amorphous phase modification apparatus, and in particular, relates to an amorphous phase modification apparatus and a processing method of single crystal material using the same.

Description of Related Art

For single crystal materials, silicon carbide is a notable example that has great industrial application value and is relatively difficult to cut mechanically. Silicon carbide single crystal wafers can be used to make transistors and be used in fields such as electric vehicles or power conversion because they can be suitably used under high temperature and high voltage. As far as the prior art is concerned, diamond wires are generally used to cut silicon carbide ingots to obtain wafers. However, a cutting lane kerf loss of this method is relatively large, and a cutting lane kerf loss of 150 microns to 300 microns is commonly observed.

In addition, conventional methods have attempted to use pulsed lasers to modify the interior of single crystal silicon or sapphire, wherein a wavelength of laser light can partially penetrate the material. After modification by laser light, since the modified layer is no longer the original single crystal structure, its bonding strength has been greatly reduced as compared with single crystal materials. Therefore, after an external force is applied, a part of the single crystal material can be sliced or separated out. However, the conventional laser light used may easily cause the modified layer to have an overlarge thickness, thus losing the advantage of reducing the cutting lane kerf loss when using laser light for modification.

At present, there is still a lack of an effective laser light application method, which reduces the thickness of the modified layer to tens of microns or less, and a single crystal material processing method that effectively produces the modified layer. Therefore, there is an urgent need for a processing method of a single crystal material to solve the above problems.

SUMMARY

The present disclosure provides an amorphous phase modification apparatus and a processing method of a single crystal material, which can effectively produce a modified layer and whereby a thickness of the modified layer is reduced.

In some embodiments of the present disclosure, an amorphous phase modification apparatus can be used for forming an amorphous phase modified layer. The amorphous phase modification apparatus comprises a femtosecond laser source, a speckle adjuster, a beam angle scanner, focusing objective lens and a motion module. The femtosecond laser source is used for emitting a laser beam. The speckle adjuster is used for adjusting a speckle size of the laser beam emitted by the femtosecond laser source. The beam angle scanner is used for adjusting an angle of the laser beam received from the speckle adjuster, and the beam angle scanner performs a small angle scanning at a motion frequency of 100 Hz to 10,000 Hz. The focusing objective lens is used for receiving the laser beam passing through the beam angle scanner, and for focusing the laser beam. The motion module is used for carrying an object to be modified, and allowing the object to be modified to receive the laser beam passing through the focusing objective lens.

In one embodiment of the present disclosure, a wavelength of the laser beam emitted by the femtosecond laser source is 800 nm to 1600 nm.

In one embodiment of the present disclosure, a wavelength of the laser beam emitted by the femtosecond laser source is 1020 nm to 1080 nm.

In one embodiment of the present disclosure, the beam angle scanner has a single axis of rotation.

In one embodiment of the present disclosure, the small angle is 0.01 radians to 0.05 radians.

In one embodiment of the present disclosure, the beam angle scanner is a resonant scanner, a piezoelectric material driven lens or an acoustic optic modulator.

In one embodiment of the present disclosure, a pulse repetition rate of the laser beam emitted by the femtosecond laser source ranges from 100 kHz to 10 MHz, a pulse width ranges from 300 femtoseconds to 2000 femtoseconds, and a pulse energy ranges from 1 microjoules and microjoules.

In one embodiment of the present disclosure, the pulse repetition rate of the laser beam emitted by the femtosecond laser source ranges from 500 kHz to 1000 kHz, and a pulse width ranges from 1000 femtoseconds to 2000 femtoseconds.

In one embodiment of the present disclosure, a speckle quality ($M^2$) of the laser beam after passing through speckle adjuster is in a range of 1.0 to 1.4.

In one embodiment of the present disclosure, the beam angle scanner performs the small angle scanning at the motion frequency of 100 Hz to 800 Hz.

A processing method of a single crystal material in accordance with the embodiments of the present disclosure includes the following steps. A single crystal material is provided as an object to be modified. An amorphous phase modification apparatus is used for emitting a femtosecond laser beam to process an internal portion of the object to be modified. The processing includes using a femtosecond laser beam to form a plurality of processing lines in the internal portion of the object to be modified, wherein each of the processing lines include a zigzag pattern processing, and a processing line spacing between the plurality of processing lines is in a range of 200 μm to 600 μm, wherein after the object to be modified is processed, a modified layer is formed in the object to be modified. Slicing or separating out a portion in the object to be modified that includes the modified layer.

In one embodiment of the present disclosure, the processing further comprises using the femtosecond laser beam for processing along an edge of the object to be modified.

In one embodiment of the present disclosure, using the femtosecond laser for processing the internal portion of the object to be modified is performed by processing under a flat-cut vertical mode relative to a crystal axis direction of the single crystal material.

In one embodiment of the present disclosure, a number of processing turns of each of the plurality of processing lines ranges from 2 turns to 10 turns.

In one embodiment of the present disclosure, the number of processing turns of each of the plurality of processing lines ranges from 2 turns to 6 turns.

In one embodiment of the present disclosure, the processing of the internal portion of the object to be modified is performed with a galvanometer amplitude of 0.02 microns to 0.08 microns.

In one embodiment of the present disclosure, each of the plurality of processing lines is processed by using the femtosecond laser beam at a processing speed of 5 mm/s to 20 mm/s for processing the internal portion of the object to be modified.

In one embodiment of the present disclosure, each of the plurality of processing lines is processed by using the femtosecond laser beam at a processing power of 3 W to 8.5 W for processing the internal portion of the object to be modified.

In one embodiment of the present disclosure, using the femtosecond laser beam to form the plurality of processing lines in the internal portion of the object to be modified is performed by processing an entire piece of the internal portion of the object to be modified by a non-stitching method.

In one embodiment of the present disclosure, using the femtosecond laser beam to form the plurality of processing lines in the internal portion of the object to be modified is performed by a stitching method wherein after a first part of the internal portion of the object to be modified is processed, a second part of the internal portion of the object to be modified is then processed.

Based on the above, the amorphous phase modification apparatus and processing method of a single crystal material of the embodiments of the present disclosure can effectively produce a modified layer while reducing a thickness of the modified layer. Accordingly, the thickness of the modified layer can be much smaller than the cutting lane kerf loss caused by mechanical cutting, and the modified layer can be easily separated when external force is applied.

BRIEF DESCRIPTION OF THE DRAWINGS

FIG. 3 to FIG. 6 are schematic diagrams of a processing method of a single crystal material according to an embodiment of the present disclosure.

FIG. 7A is an optical microscope image after forming a modified layer according to the processing method in an embodiment of the present disclosure.

FIG. 7B is an optical microscope image without forming a modified layer according to the processing method in a comparative example of the present disclosure.

DESCRIPTION OF THE EMBODIMENTS

Figure 1:
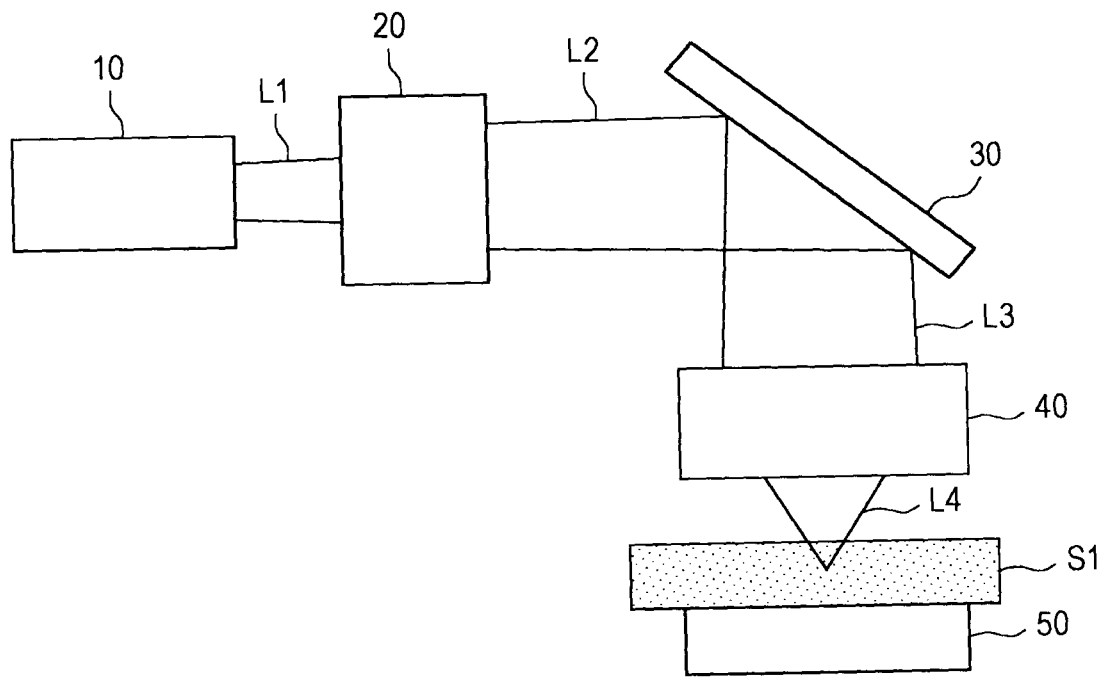
FIG. 1 is a schematic diagram of an amorphous phase modification apparatus according to an embodiment of the present disclosure.

FIG. 1 is a schematic diagram of an amorphous phase modification apparatus according to an embodiment of the present disclosure. The amorphous phase modification apparatus of the embodiment of the present disclosure can be used to form an amorphous phase modified layer in a single crystal material. Referring to FIG. 1, the amorphous phase modification apparatus includes a femtosecond laser source 10, a speckle adjuster 20, a beam angle scanner 30, a focusing objective lens 40, and a motion module 50. As shown in FIG. 1, the femtosecond laser source 10 can be used for emitting a laser beam L1. In the embodiment of the present disclosure, a wavelength of the laser beam L1 emitted by the femtosecond laser source 10 is a wavelength that can penetrate the object to be modified S1 (single crystal material to be modified). For example, when the object to be modified S1 is silicon carbide, the wavelength of the laser beam L1 is in a range of 800 nm to 1600 nm. In some embodiments, the wavelength of the laser beam L1 is in the range of 1020 nm to 1080 nm. In addition, in some embodiments of the present disclosure, the femtosecond laser source 10 is constructed using transparent glass or crystals with suitable laser gain materials such as doped ytterbium.

In an exemplary embodiment, a pulse repetition rate of the laser beam L1 emitted by the femtosecond laser source 10 ranges from 100 kHz to 10 MHz, a pulse width ranges from 300 femtoseconds to 2000 femtoseconds, and a pulse energy ranges from 1 microjoule to 30 microjoules. In certain embodiments, the pulse repetition rate of the laser beam L1 emitted by the femtosecond laser source 10 ranges from 500 kHz to 1000 kHz, and the pulse width ranges from 1000 femtoseconds to 2000 femtoseconds. scope. In addition, the femtosecond laser source 10 of the embodiment of the present disclosure should include means for adjusting an output power thereof by receiving an external voltage signal or instruction.

As shown in FIG. 1, the speckle adjuster 20 is used to adjust a speckle size of the laser beam L1 emitted by the femtosecond laser source 10. In some embodiments, the speckle adjuster 20 is used to expand the speckle size of the femtosecond laser source 10 to achieve a function of extremely small focal point after focusing. Due to the high energy density at the focal point, the energy density will drop rapidly when moved a little distance away from the focal point. Therefore, if the modification is performed using the above conditions, there is an effect that the distribution of the modified regions in the vertical direction is small. In some embodiments of the present disclosure, the speckle quality ($M^2$) of the laser beam L1 after passing through the speckle adjuster 20 is in a range of 1.0 to 1.4.

Referring to FIG. 1, the beam angle scanner 30 is used to adjust the angle of the laser beam L2 received from the speckle adjuster 20. In some embodiments, the beam angle scanner 30 performs a small angle scanning at a motion frequency of 100 Hz to 10,000 Hz. That is, the small angle can be scanned back and forth one hundred to ten thousand times in one second. In some embodiments, the beam angle scanner 30 performs the small angle scanning at a motion frequency of 100 Hz to 800 Hz. That is, the small angle can be scanned back and forth one hundred to eight hundred times in one second. In addition, the small angle is 0.01 radians to 0.05 radians, which equals to scanning at +/−0.005 radians to +/−0.025 radians.

In the embodiment of the present disclosure, the beam angle scanner 30 can be implemented in different ways. For example, a resonant scanner, a piezoelectric material driven lens, or an acoustic optic modulator can be used as the beam angle scanner 30. In addition, in the embodiment of the present disclosure, the difference between the beam angle scanner 30 and the conventional galvo-scanner is that the beam angle scanner 30 includes only a single axis rotation. However, the present disclosure is not limited thereto. In some other embodiments, the beam angle scanner 30 can also have two or more rotation axes.

Figure 2:
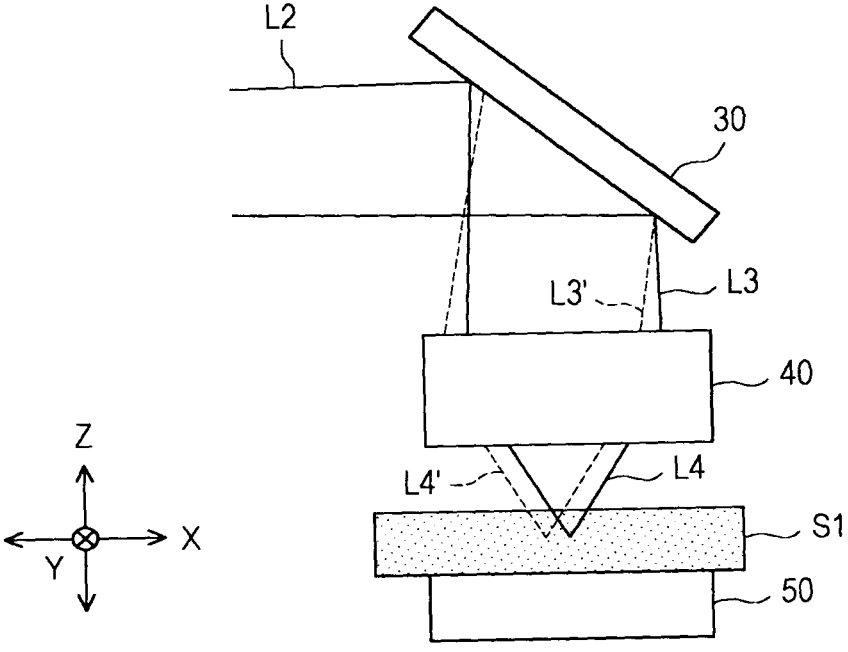
FIG. 2 is a schematic diagram of an amorphous phase modification apparatus during operation according to an embodiment of the present disclosure.

Referring further to FIG. 1, the focusing objective lens 40 is used for receiving the laser beam L3 passing through the beam angle scanner 30, and used for focusing the laser beam L3. In addition, the motion module 50 is used for carrying the object to be modified S1, and allowing the object to be modified S1 to receive the laser beam L4 passing through the focusing objective lens 40. As shown in FIG. 2, in one embodiment of the present disclosure, when the amorphous phase modification apparatus is under operation, a rotation axis of the beam angle scanner 30 is in a +Y direction, which is the incident paper direction. Accordingly, when the beam angle scanner 30 rotates, the laser beam L3 will deviate in the direction of the X-axis. The X-direction of deviation of the laser beam L3' will directly cause an offset direction of the focused laser beam L4' to also fall in the X-axis direction. Therefore, the moving direction of the motion module 50 must be perpendicular to the beam offset direction X-axis, which means moving in the Y-axis direction. In other words, in the embodiment of the present disclosure, it is a preferred setting that the scanning direction is perpendicular to a moving direction of the motion module 50. Under such conditions, the scanned area is the largest at a fixed scanning angle, and so the amorphous modification effect of the laser can be most efficient.

Figure 3:
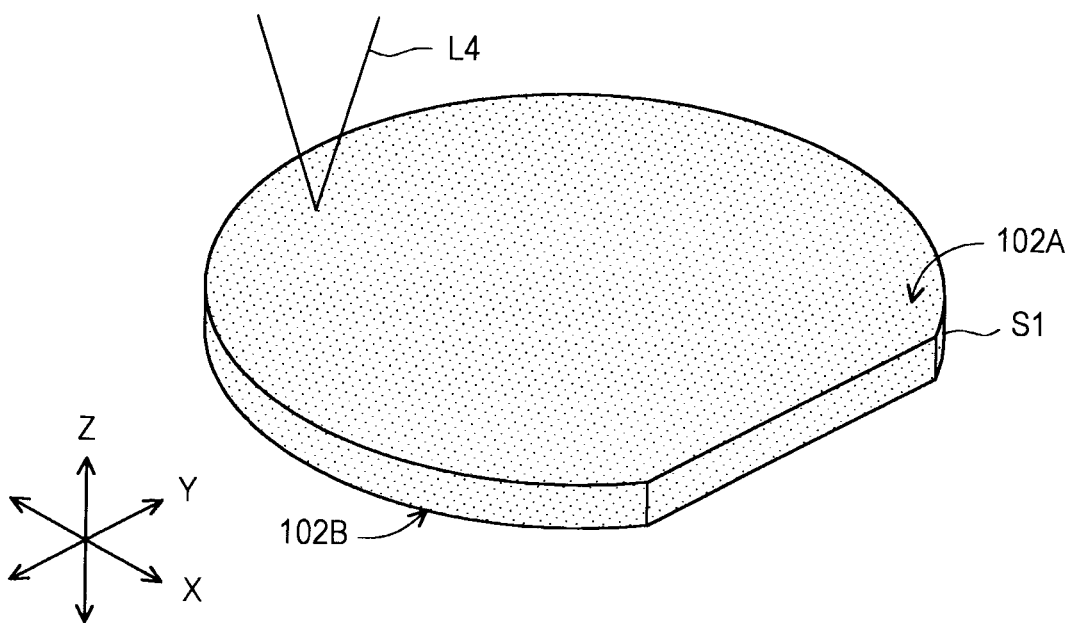

FIG. 3 to FIG. 6 are schematic diagrams of a processing method of a single crystal material according to an embodiment of the present disclosure. Referring to FIG. 3, in a processing method of single crystal material according to some embodiments of the present disclosure, a single crystal material is provided as the object to be modified S1. The single crystal material is, for example, a single crystal material made of silicon carbide. In some embodiments, the object to be modified S1 has a first surface 102A, and a second surface 102B opposite to the first surface 102A. As shown in FIG. 3, an internal portion of the object to be modified S1 is processed from the first surface 102A by using a femtosecond laser beam L4 emitted by the amorphous phase modification apparatus shown in FIG. 1.

Figure 4A:
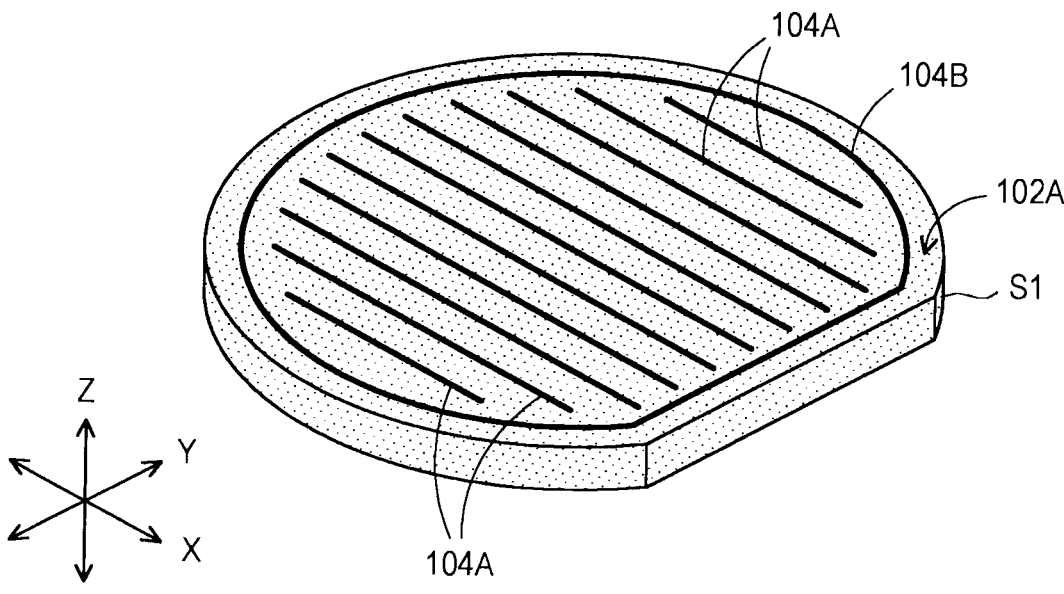
Figure 4B:
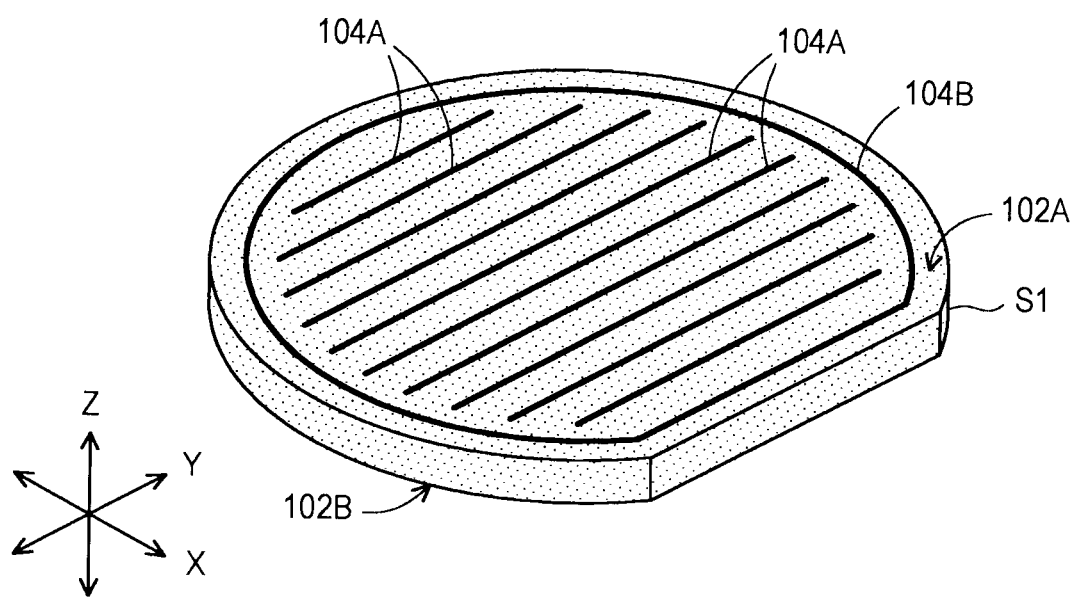

As shown in FIG. 4A and FIG. 4B, the femtosecond laser beam L4 is used to form a plurality of processing lines 104A in the internal portion of the object to be modified S1. In an embodiment of the present disclosure, the processing line spacing between the processing lines 104A is in a range of 200 μm to 600 μm. In some embodiments, the processing further includes using the femtosecond laser beam L4 for processing along an edge of the object to be modified S1 to form the processing line 104B at the edge. It is worth to note that during the use of the modification apparatus for processing the object to be modified S1, the surfaces 102A and 102B of the object to be modified S1 is unmodified. Instead, it is an internal portion of the object to be modified S1 that will be modified. For example, as shown in FIG. 6, only layer 106 located in the internal portion of the object to be modified S1 is being modified, while the surfaces 102A and 102B remain unmodified.

As shown in FIG. 4A, in some embodiments, using the femtosecond laser beam L4 for processing the internal portion of the object to be modified S1 to form a plurality of processing lines 104A is performed by processing under a flat-cut vertical mode relative to a crystal axis direction of the single crystal material. For example, in the current embodiment, the plurality of processing lines 104A extend along the X-axis direction, and are arranged in parallel with the Y-axis direction. As shown in FIG. 4B, in some other embodiments, using the femtosecond laser beam L4 for processing the internal portion of the object to be modified S1 to form a plurality of processing lines 104A is performed by processing under a flat-cut parallel mode relative to a crystal axis direction of the single crystal material. For example, in this embodiment, a plurality of processing lines 104A extend along the Y-axis direction and are arranged in parallel with the X-axis direction. In other embodiments, the processing method can be processed in the direction that correspond to any other markings such as: flat-cut, notch, or other mark directions that can correspond to the crystal axis direction, and the present disclosure is not limited thereto.

In an exemplary embodiment, a number of processing turns of each processing lines 104A/104B ranges from 2 turns to 10 turns. In some embodiments, the number of processing turns of each processing lines 104A/104B ranges from 2 turns to 6 turns. In case where the number of processing turns of the processing lines 104A/104B is lower than the above-mentioned range, then the number of processing turns is too low, and cannot effectively form a modified layer in the object to be modified S1. In case where the number of processing turns of the processing lines 104A/104B is higher than the above-mentioned range, the processing time will be too long, which is not economical, and the thickness of the formed modified layer may be too large.

Figure 5:
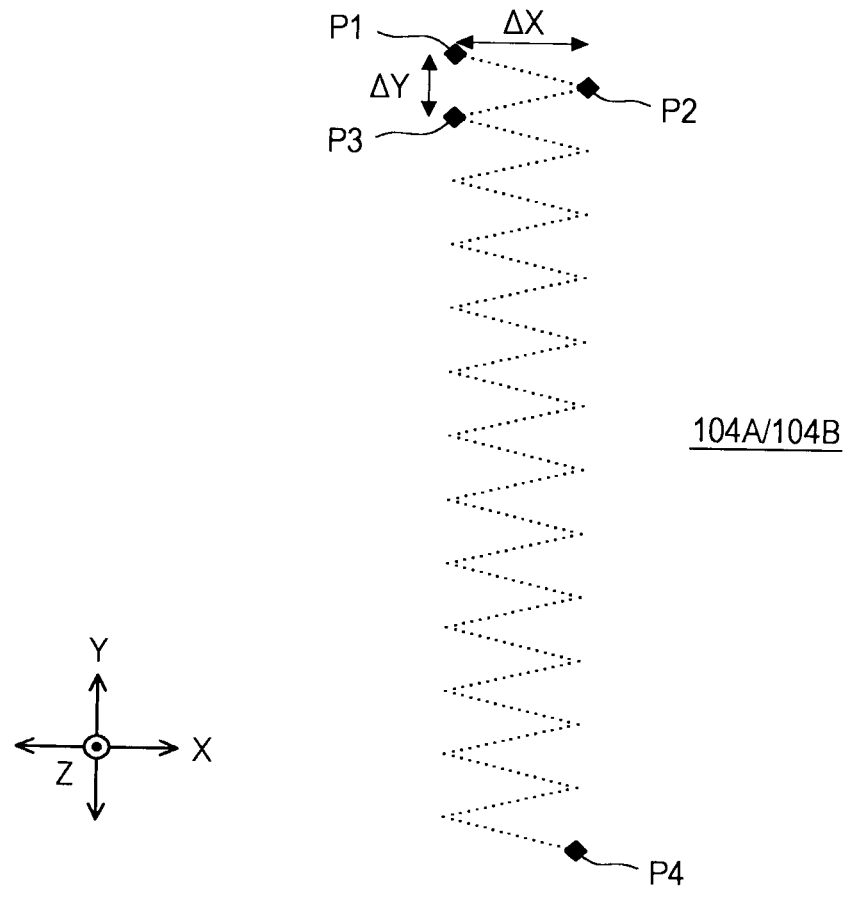

As shown in FIG. 5, in some embodiments, the processing of each processing lines 104A/104B includes a zigzag pattern processing. For example, referring to FIG. 5, P1 is a starting point of the processing path, P2 is a turning point of the first path, P3 is a turning point of the second path, and then the above zigzag pattern processing is repeated until the path end point P4 is reached. In the above-mentioned embodiment, the distance between the starting point P1 and the turning point P2 in the X-axis direction is ΔX, which is determined by a scanning angle of the beam angle scanner 30. In other words, the distance ΔX is equal to f*Δθ, whereby f is a focal length of the focusing objective lens 40, and Δθ is the scanning angle of the beam angle scanner 30. In addition, the distance ΔY is determined by a moving speed of the motion module 50 and the swing frequency of the beam angle scanner 30. In other words, the distance ΔY is equal to $$V * \left( \frac{1}{f \text{ scan}} \right) * (1/2),$$

whereby v is the linear moving speed of the motion module 50, and fscan is the swing frequency of the beam angle scanner 30. In some specific embodiments, the distance ΔX is 50 microns to 100 microns, and a ratio of the distance ΔX to the distance ΔY (ΔX:ΔY) is 1:0.5 to 1:1 to achieve an effect of obtaining an ideal modified layer.

In addition, in the embodiment of the present disclosure, the processing of each processing lines 104A/104B is performed by processing the internal portion of the object to be modified S1 with a galvanometer amplitude of 0.02 microns to 0.08 microns. Each processing lines 104A/104B is processed by using the femtosecond laser beam at a processing speed of 5 mm/s to 20 mm/s for processing the internal portion of the object to be modified S1. In addition, each processing lines 104A/104B is processed by using the femtosecond laser beam at a processing power of 3 W to 8.5 W for processing the internal portion of the object to be modified S1. Moreover, the first turn of processing of each processing lines 104A/104B is performed by using the femtosecond laser beam with a relatively low processing power of 3 W to 6 W to process the internal portion of the object to be modified S1. Once the processing method of the single crystal material in the embodiment of the present disclosure fulfills the above conditions, an ideal modified layer can be effectively formed.

As shown in FIG. 6, in the embodiment of the present disclosure, after the processing of the object to be modified S1 by using the laser beam L4, a modified layer 106 is formed inside (e.g. the internal portion) the object S1 to be modified. For example, an optical microscope is used to determine whether there is a continuous crack CX1 formed between the processing lines 104A, to determine whether the modified layer 106 is appropriately formed or not. In some embodiments, the thickness of the formed modified layer 106 is controlled within a range of 40 microns to 80 microns. FIG. 7A is an optical microscope image after forming a modified layer according to the processing method in an embodiment of the present disclosure. FIG. 7B is an optical microscope image without forming a modified layer according to the processing method in a comparative example of the present disclosure. As shown in FIG. 7A, if continuous cracks CX1 between the processing lines 104A can be clearly observed from the optical microscope, it can be judged that the modified layer 106 has been successfully formed. On the other hand, as shown in FIG. 7B, if no obvious continuous crack CX1 is observed from the optical microscope, it means that the object to be modified S1 has not been successfully modified. After successfully forming the modified layer 106 using the processing method of the embodiment of the present disclosure, a portion having the modified layer 106 in the object to be modified S1 can be sliced or separated out. For example, if the object to be modified S1 is a silicon carbide ingot, an external force can be easily applied along the modified layer 106 to separate and obtain a silicon carbide wafer.

Figure 8A:
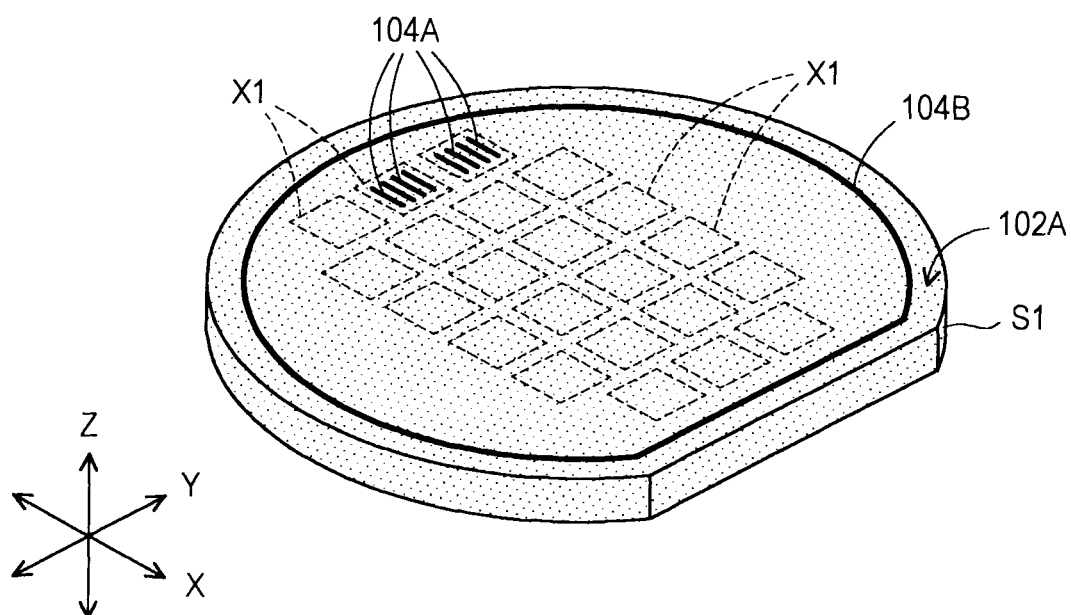
FIG. 8A to FIG. 8B are schematic diagrams of a processing method of a single crystal material according to another embodiment of the present disclosure.
Figure 8B:
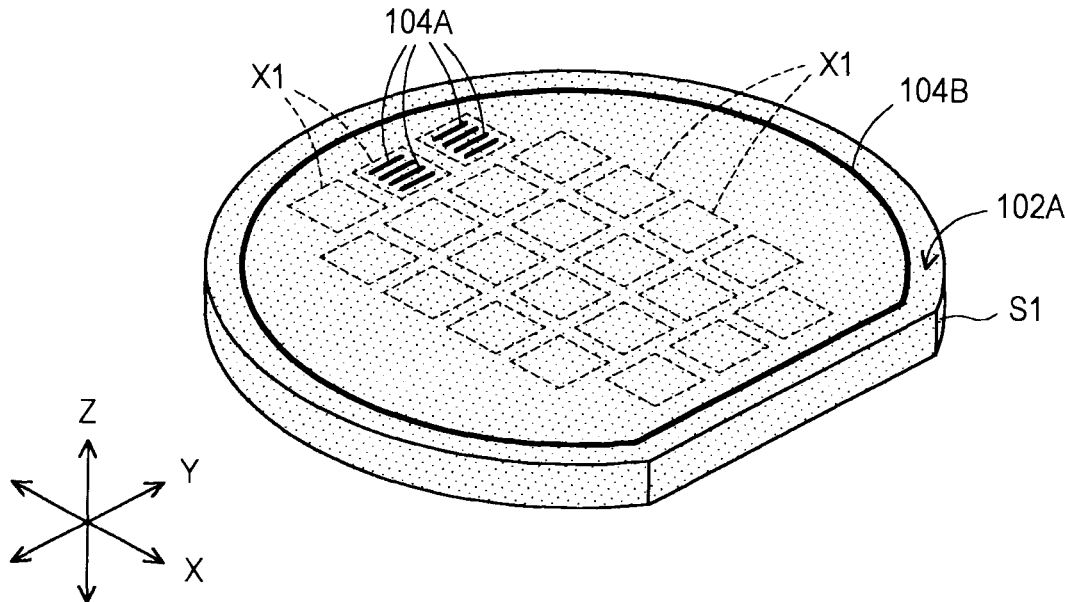

FIG. 8A to FIG. 8B are schematic diagrams of a processing method of a single crystal material according to another embodiment of the present disclosure. In the foregoing embodiments, processing of the object to be modified S1 is performed by processing an entire piece of the internal portion from the first surface 102A. In other words, the femtosecond laser beam is used to form the plurality of processing lines 104A/104B in the internal portion of the object to be modified S1 by a non-stitching method. However, the disclosure is not limited thereto. Referring to FIG. 8A and FIG. 8B, in the embodiment of the present disclosure, the femtosecond laser beam is used to form the plurality of processing lines 104A/104B in the internal portion of the object to be modified S1 by a stitching method, wherein after a first part of the internal portion of the object to be modified S1 is processed, a second part (or other parts) of the internal portion of the object to be modified S1 is then processed.

For example, the object to be modified S1 in the embodiment of the present disclosure may have multiple parts X1 included therein, and the processing is performed by completing the formation of a plurality of processing lines 104A in one of the parts X1 of the object to be modified S1, then processing may be continued to form the plurality of processing lines 104A in another part X1 of the object to be modified S1. Accordingly, after processing of the multiple parts X1 of the object to be modified S1 is completed, the processing of the internal portion of the object to be modified S1 can be accomplished by stitching, and so that the modified layer 106 is formed. In addition, as shown in FIG. 8A and FIG. 8B, the processing method for forming a plurality of processing lines 104A is performed by processing under a flat-cut vertical mode relative to a crystal axis direction of the single crystal material 1 (as in FIG. 8A), or by processing under a flat-cut parallel mode relative to a crystal axis direction of the single crystal material (as in FIG. 8B). In other embodiments, the processing method can be processed in the direction that correspond to any other markings such as: flat-cut, notch, or other mark directions that can correspond to the crystal axis direction, and the present disclosure is not limited thereto.

EXAMPLES

In order to prove that the processing method of the single crystal material of the present disclosure can effectively form the modified layer, and simultaneously reduce the thickness of the modified layer, and so that the thickness of the modified layer can be much smaller than the kerf loss caused by mechanical cutting, the following examples are used for providing further description.

First Example

In the first example, the non-stitching method shown in FIG. 3 to FIG. 6, and the flat-cut vertical mode is performed for processing, and the processing conditions of the galvanometer amplitude, processing line spacing, processing line speed, processing turns, processing power and total processing time of examples 1 to 7 (EX1 to EX7) and comparative examples 1 to 7 (CX1 to CX7) are as described in Table 1. In addition, the evaluation of whether a modified layer is successfully formed or not is judged by whether cracks are observed in the optical microscope, and the evaluation results are listed in Table 1.

TABLE 1

| Processing conditions | EX1 | EX2 | EX3 | EX4 | EX5 | CX1 | CX2 | EX6 | CX3 | CX4 | CX5 | EX7 | CX6 | CX7 |
|---|---|---|---|---|---|---|---|---|---|---|---|---|---|---|
| AMP (galvano-meter amplitude (μm) | 0.04 | 0.04 | 0.04 | 0.04 | 0.04 | 0.04 | 0.04 | 0.04 | 0.04 | 0.01 | 0.1 | 0.04 | 0.04 | 0.04 |
| D (processing line spacing) (μm) | 250 | 250 | 250 | 250 | 250 | 250 | 250 | 250 | 250 | 250 | 250 | 100 | 700 | 250 |
| LS (processing | 5 | 6 | 7 | 5 | 6 | 7 | 5 | 6 | 7 | 5 | 5 | 5 | 5 | 5 |

TABLE 1-continued

| Processing conditions | EX1 | EX2 | EX3 | EX4 | EX5 | CX1 | CX2 | EX6 | CX3 | CX4 | CX5 | EX7 | CX6 | CX7 |
|---|---|---|---|---|---|---|---|---|---|---|---|---|---|---|
| line speed) (mm/s) | | | | | | | | | | | | | | |
| N (processing turns) | 6 | 6 | 6 | 6 | 6 | 6 | 6 | 6 | 6 | 6 | 6 | 6 | 6 | 1 |
| P (processing power) (W) | 3.7 | 3.7 | 3.7 | 3.9 | 3.9 | 3.9 | 4.1 | 4.1 | 4.1 | 3.7 | 3.7 | 3.7 | 3.7 | 3.7 |
| T(total processing time = processing turns/ processing line speed/ processing line spacing * 10000) [a.u.] | 48 | 40 | 34.3 | 48 | 40 | 34.3 | 48 | 40 | 34.3 | 48 | 48 | 120 | 17.1 | 8 |
| Status | Cracks observed | Cracks observed | Cracks observed | Cracks observed | Cracks observed | No continuous cracks | No continuous cracks | Cracks observed | No continuous cracks | No continuous cracks | No continuous cracks | Cracks observed | No continuous cracks | No continuous cracks |
| Evaluation | OK | OK | OK | OK | OK | NG | NG | OK | NG | NG | NG | OK | NG | NG |

As shown in example 1 (EX1) to example 7 (EX7) of Table 1, when the galvanometer amplitude, the processing line spacing, the processing line speed, the number of processing turns, and the processing power are within the range of the present disclosure during processing, then cracks can be successfully formed between the plurality of processing lines, and thus a modified layer is successfully formed (evaluated as OK). In comparison, referring to comparative example 1 (CX1) and comparative example 3 (CX3), when the processing speed is too high (above 7 mm/s), and where high power is used (above 3.9 W), then continuous cracks are not formed between the plurality of processing lines, thus a modified layer cannot be successfully formed (evaluated as NG). Referring to comparative example 2 (CX2), when the processing power is too high (4.1 W) and where the processing speed is relatively low (5 mm/s), then continuous cracks are not formed between the plurality of processing lines, thus a modified layer cannot be successfully formed. Referring to comparative example 4 (CX4), when the galvanometer amplitude is too small, then continuous cracks are not formed between the plurality of processing lines, thus a modified layer cannot be successfully formed. Referring to comparative example 5 (CX5), when the galvanometer amplitude is too large, the processing density will be too low and it becomes difficult for cracks to extend, thus a modified layer cannot be successfully formed. Referring to comparative example 6 (CX6), when the processing line spacing is too large, even if cracks are formed, the cracks become difficult to extend because the spacing between the processing lines is too large, thus a modified layer cannot be successfully formed. Referring to comparative example 7 (CX7), if the number of processing turns is too low (1 turn), then continuous cracks are not formed between the plurality of processing lines, thus a modified layer cannot be successfully formed.

Second Example

In the second embodiment, the stitching method shown in FIG. 8A, and the flat-cut vertical mode is performed for processing, and the processing conditions of the galvanometer amplitude, processing line spacing, processing line speed, processing turns, processing power and total processing time of examples 8 to 11 (EX8 to EX11) and comparative examples 8 to 12 (CX8 to CX12) are as described in Table 2. In addition, the evaluation of whether a modified layer is successfully formed or not is judged by whether cracks are observed in the optical microscope, and the evaluation results are listed in Table 2.

TABLE 2

| Processing conditions | CX8 | EX8 | CX9 | CX10 | EX9 | EX10 | CX11 | EX11 | CX12 | CX13 |
|---|---|---|---|---|---|---|---|---|---|---|
| AMP (galvanometer amplitude (μm) | 0.01 | 0.03 | 0.1 | 0.03 | 0.03 | 0.03 | 0.03 | 0.03 | 0.03 | 0.03 |
| D (processing line spacing) (μm) | 500 | 500 | 500 | 700 | 100 | 500 | 500 | 500 | 500 | 500 |
| LS (processing | 10 | 10 | 10 | 10 | 10 | 3 | 10 | 10 | 10 | 10 |

TABLE 2-continued

| Processing conditions | CX8 | EX8 | CX9 | CX10 | EX9 | EX10 | CX11 | EX11 | CX12 | CX13 |
|---|---|---|---|---|---|---|---|---|---|---|
| line speed) (mm/s) | | | | | | | | | | |
| N (processing turns) | 1 + 1 | 1 + 1 | 1 + 1 | 1 + 1 | 1 + 1 | 1 + 1 | 1 | 10 | 10 | 10 |
| P (processing power) (W) | 5.5/8.3 | 5.5/ 8.3 | 5.5/8.3 | 5.5/ 8.3 | 5.5/ 8.3 | 5.5/ 8.3 | 5.5/8.3 | 5.5/ 8.3 | 8.3/8.3 | 3/8.3 |
| T(total processing time = processing turns/ processing line speed/ processing line spacing * 10000) [a.u.] | 4 | 4 | 4 | 2.85 | 20 | 13.3 | 2 | 20 | 4 | 4 |
| Status | No continuous cracks | Cracks observed | No continuous cracks | No continuous cracks | Cracks observed | Cracks observed | No continuous cracks | Cracks observed | No continuous cracks | No continuous cracks |
| Evaluation | NG | OK | NG | NG | OK | OK | NG | OK | NG | NG |

As shown in example 8 (EX8) to example 11 (EX11) in Table 2, when the galvanometer amplitude, processing line spacing, processing line speed, processing turns, and processing power are within the range of the present disclosure during processing, then even if the stitching method is used for processing, cracks can be successfully formed between the plurality of processing lines, and thus a modified layer is successfully formed. In comparison, referring to comparative example 8 (CX8), when the galvanometer amplitude is too small, then continuous cracks are not formed between the plurality of processing lines, thus a modified layer cannot be successfully formed. Referring to comparative example 9 (CX9), when the galvanometer amplitude is too large, the processing density will be too low and it becomes difficult for cracks to extend, thus a modified layer cannot be successfully formed. Referring to comparative example 10 (CX10), when the processing line spacings is too large, even if cracks are formed, the cracks become difficult to extend because the spacing between the processing lines is too large, thus a modified layer cannot be successfully formed. Referring to comparative example 11 (CX11), if the number of processing turns is too low (1 turn), then continuous cracks are not formed between the plurality of processing lines, thus a modified layer cannot be successfully formed. Referring to comparative example 12 (CX12), when the power of the first turn is too high (8.3 W), vertical damage will be formed, causing non-horizontal cracks and making it difficult for continuous cracks to extend, thus a modified layer cannot be effectively formed. Referring to comparative example 13 (CX13), when the power of the first turn is too low (3 W), then continuous cracks are not formed between the plurality of processing lines, thus a modified layer cannot be successfully formed.

According to the above, the amorphous phase modification apparatus and the processing method of a single crystal material in the embodiment of the present disclosure can successfully form a modified layer using femtosecond laser light, and whereby the thickness of the modified layer reduced (controlled in the range of 40-80 microns). As such, the thickness of the modified layer can be much smaller than the loss of cutting lanes caused by mechanical cutting, and the modified layer can be easily separated after applying external force.

What is claimed is:

1. An amorphous phase modification apparatus, used for forming an amorphous phase modified layer, wherein the amorphous phase modification apparatus comprises:
   a femtosecond laser source, used for emitting a laser beam;
   a speckle adjuster, used for adjusting a speckle size of the laser beam emitted by the femtosecond laser source;
   a beam angle scanner, used for adjusting an angle of the laser beam received from the speckle adjuster, and the beam angle scanner performs a small angle scanning at a motion frequency of 100 Hz to 10,000 Hz;
   focusing objective lens, used for receiving the laser beam passing through the beam angle scanner, and for focusing the laser beam; and
   a motion module, used for carrying an object to be modified, and allowing the object to be modified to receive the laser beam passing through the focusing objective lens,
   wherein the beam angle scanner is a resonant scanner, a piezoelectric material driven lens or an acoustic optic modulator.

2. The amorphous phase modification apparatus according to claim 1, wherein a wavelength of the laser beam emitted by the femtosecond laser source is 800 nm to 1600 nm.

3. The amorphous phase modification apparatus according to claim 2, wherein a wavelength of the laser beam emitted by the femtosecond laser source is 1020 nm to 1080 nm.

4. The amorphous phase modification apparatus according to claim 1, wherein the beam angle scanner has a single axis of rotation.

5. The amorphous phase modification apparatus according to claim 1, wherein the small angle is 0.01 radians to 0.05 radians.

6. The amorphous phase modification apparatus according to claim 1, wherein a pulse repetition rate of the laser beam emitted by the femtosecond laser source ranges from 100 kHz to 10 MHz, a pulse width ranges from 300 femtoseconds to 2000 femtoseconds, and a pulse energy ranges from 1 microjoules and 30 microjoules.

7. The amorphous phase modification apparatus according to claim 6, wherein the pulse repetition rate of the laser beam emitted by the femtosecond laser source ranges from 500 kHz to 1000 kHz, and a pulse width ranges from 1000 femtoseconds to 2000 femtoseconds.

8. The amorphous phase modification apparatus according to claim 1, wherein a speckle quality ($M^2$) of the laser beam after passing through the speckle adjuster is in a range of 1.0 to 1.4.

9. The amorphous phase modification apparatus according to claim 1, wherein the beam angle scanner performs the small angle scanning at the motion frequency of 100 Hz to 800 Hz.

* * * * *